(12) United States Patent
Doerksen et al.

(10) Patent No.: US 10,293,243 B1
(45) Date of Patent: May 21, 2019

(54) CONTROL SYSTEM FOR ELECTRIC VEHICLES

(71) Applicant: Future Motion, Inc., Santa Cruz, CA (US)

(72) Inventors: Kyle Jonathan Doerksen, Santa Cruz, CA (US); Daniel J. Wood, Camas, WA (US); Julian De La Rua, Santa Cruz, CA (US)

(73) Assignee: Future Motion, Inc., Santa Cruz, CA (US)

( * ) Notice: Subject to any disclaimer, the term of this patent is extended or adjusted under 35 U.S.C. 154(b) by 0 days.

(21) Appl. No.: 16/208,485

(22) Filed: Dec. 3, 2018

Related U.S. Application Data

(60) Provisional application No. 62/593,817, filed on Dec. 1, 2017.

(51) Int. Cl.
*H02P 21/00* (2016.01)
*A63C 17/12* (2006.01)
*A63C 17/01* (2006.01)
*A63C 17/22* (2006.01)
*A63C 17/26* (2006.01)
*B60L 11/18* (2006.01)
*B60K 7/00* (2006.01)

(52) U.S. Cl.
CPC ............ *A63C 17/12* (2013.01); *A63C 17/016* (2013.01); *A63C 17/223* (2013.01); *A63C 17/226* (2013.01); *A63C 17/26* (2013.01); *B60K 7/0007* (2013.01); *B60L 11/1809* (2013.01); *A63C 2203/12* (2013.01); *A63C 2203/14* (2013.01); *B60L 2200/14* (2013.01); *B60L 2220/44* (2013.01); *B60L 2220/46* (2013.01); *B60L 2240/22* (2013.01)

(58) Field of Classification Search
CPC ...... H02P 1/00; H02P 1/26; H02P 1/46; H02P 3/00; H02P 3/06; H02P 3/14; H02P 3/16; H02P 6/00; H02P 6/182; H02P 6/24; H02P 21/00; H02P 21/0042; H02P 21/0046; H02P 21/0089; H02P 21/08; H02P 23/00; H02P 27/00; H02P 27/04; H02P 27/06; H02P 27/08
See application file for complete search history.

(56) References Cited

U.S. PATENT DOCUMENTS 7,592,766 B2 * 9/2009 Patel ..................... B60K 6/26
318/400.02

* cited by examiner

*Primary Examiner* — Antony M Paul
(74) *Attorney, Agent, or Firm* — Kolitch Romano LLP

(57) ABSTRACT

When an electric vehicle is traveling downhill, experiencing regenerative braking, or otherwise forcing the vehicle motor to turn faster than the commanded motor torque, the vehicle motor produces electrical energy that can be used to recharge a vehicle battery. However, if the vehicle battery is already nearly or fully charged, the excess electrical energy produced may damage the battery. Control systems described herein may reduce and/or dispose of the excess energy by manipulating the motor flux (i.e., direct) current and quadrature current independently.

20 Claims, 10 Drawing Sheets

CONTROL SYSTEM FOR ELECTRIC VEHICLES

FIELD

This disclosure relates to systems and methods for managing energy recover in regenerative braking systems for electric vehicles.

INTRODUCTION

When a self-balancing (or other) electric vehicle utilizing a permanent magnet motor is in the process of stopping or being driven downhill, the system may be configured to inherently recover energy and oppose forward motion by causing the hub motor(s) to function as a generator, thereby converting kinetic energy into a regenerating current (typically directed to the battery) and producing a braking torque. This regenerated current can be a benefit, e.g., when used to recharge a battery. However, the current can also be damaging, e.g., if the battery is already at full capacity. Known vehicles attempt to resolve this potentially damaging over-voltage situation by forcing the rider to slow down below the regenerating threshold (which may, e.g., be 0.5 MPH), by dissipating current using resistor banks, or by suddenly shutting off. A better solution is needed to provide a better rider experience while also preventing damage to the battery.

SUMMARY

The present disclosure provides systems, apparatuses, and methods relating to control systems having over-voltage prevention features in regenerative energy situations. In some embodiments, a control system for an electric vehicle may include: a power supply; an electric motor coupled to the power supply; and a motor controller having a field-oriented control (FOC) scheme configured to control the electric motor by manipulating a direct current aligned with a rotating rotor flux angle and a quadrature current defined at ninety degrees from the rotating rotor flux angle, wherein manipulation of the direct current is independent of manipulation of the quadrature current, and the motor controller includes processing logic configured to: determine whether a counter electromotive force (CEMF) of the electric motor exceeds a voltage of the power supply by comparing a bus voltage of the power supply to a voltage threshold; and in response to the bus voltage being greater than the voltage threshold, weakening a motor flux of the electric motor and reducing the CEMF by automatically increasing the direct current.

In some embodiments, an electric vehicle may include: one or more wheels; an electric hub motor coupled to a power supply and configured to drive the one or more wheels; a motor controller having a field-oriented control (FOC) scheme configured to control the electric hub motor by manipulating a direct current aligned with a rotating rotor flux angle and a quadrature current defined at ninety degrees from the rotating rotor flux angle, wherein manipulation of the direct current is independent of manipulation of the quadrature current, and the motor controller includes processing logic configured to: determine whether a counter electromotive force (CEMF) of the electric motor exceeds a voltage of the power supply by comparing a bus voltage of the power supply to a voltage threshold; and in response to the bus voltage being greater than the voltage threshold, weakening a motor flux of the electric motor and reducing the CEMF by automatically increasing the direct current.

In some embodiments, a method for preventing damage to a power supply of an electric vehicle during regenerative braking may include: controlling an electric motor using a motor controller having a field-oriented control (FOC) scheme configured to control the electric motor by manipulating a direct current aligned with a rotating rotor flux angle and a quadrature current defined at ninety degrees from the rotating rotor flux angle, wherein manipulation of the direct current is independent of manipulation of the quadrature current; using processing logic of the motor controller to determine whether a counter electromotive force (CEMF) of the electric motor exceeds a voltage of the power supply; and in response to the CEMF of the electric motor exceeding the voltage of the power supply, weakening a motor flux of the electric motor and reducing the CEMF by automatically increasing the direct current.

Features, functions, and advantages may be achieved independently in various embodiments of the present disclosure, or may be combined in yet other embodiments, further details of which can be seen with reference to the following description and drawings.

DESCRIPTION

Figure 1:
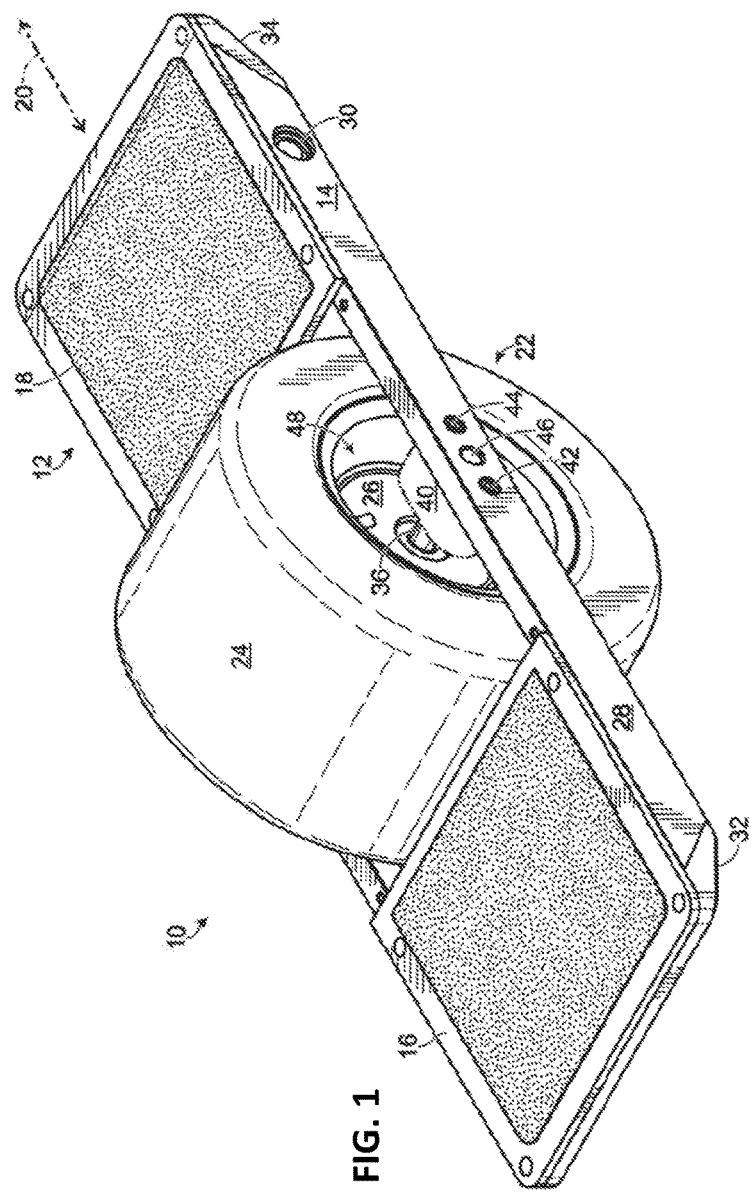
FIG. 1 is an isometric view of an illustrative one-wheeled electric vehicle suitable for use with aspects of the present disclosure.

Various aspects and examples of a control system for electric vehicles having over-voltage prevention features in regenerative energy situations, as well as related methods, are described below and illustrated in the associated drawings. Unless otherwise specified, a disclosed control system and/or its various components may, but are not required to, contain at least one of the structure, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"Coupled" means connected, either permanently or releasably, whether directly or indirectly through intervening components, and is not necessarily limited to physical connection(s).

"AKA" means "also known as," and may be used to indicate an alternative or corresponding term for a given element or elements.

"Resilient" describes a material or structure configured to be deformed elastically under normal operating loads (e.g., when compressed) and to return to an original shape or position when unloaded.

"Rigid" describes a material or structure configured to be stiff, non-deformable, or substantially lacking in flexibility under normal operating conditions.

The terms "inboard," "outboard," "forward," "rearward," and the like are intended to be understood in the context of a vehicle or host vehicle (if describing a component). For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, "forward" means toward the front portion of the vehicle, and "aft" means toward the rear of the vehicle. In the absence of a host vehicle, the same directional terms may be used as if the vehicle were present. For example, even when viewed in isolation, a device may have a "forward" edge, based on the fact that the device would be installed with the edge in question facing in the direction of the front portion of the host vehicle.

"Processing logic" may include any suitable device or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

Overview

In general, an electrical motor can function either as a motor or as a generator. When functioning as a motor, the device receives electrical power from a power source (e.g., a battery) and converts the electrical power to a torque, thereby spinning a rotor. Spinning the rotor also causes a counter electromotive force (CEMF) (also referred to as back EMF), which opposes the voltage applied by the power source (e.g., battery). In general, increasing the applied voltage speeds up the rotor. As rotor speed increases, CEMF also increases, thereby creating a greater opposing effect. Conversely, when functioning as a generator, the device receives mechanical power from a mechanical (e.g., rotating) power source, and converts the kinetic energy into electrical power. In this case, spinning the rotor also causes a counter torque or counter force, which acts to oppose the source of mechanical power. In general, this counter torque makes it increasingly more difficult to increase the rotor speed.

During normal motoring operation, electrical motors exhibit both motor and generator characteristics. The production of CEMF is in effect a generating activity. However, the CEMF is typically lower than the power source voltage, and, as long as this is the case, the motor continues to act as a load (i.e., a motor). In some instances, the CEMF may exceed the power source voltage, causing the generator function to dominate. In these situations, the device produces electrical energy that can be used or recaptured. In a regenerative braking system, the energy is recaptured by feeding it into the power source (e.g., recharging the battery).

Situations that result in this sort of regenerative activity or recapture of energy include when an electric vehicle is traveling down a hill or otherwise forcing the motor to turn faster than the commanded motor torque. When the motor turns fast enough that the CEMF exceeds the battery voltage, current will flow out of the motor and into the battery. At the same time, because the motor is now acting as a generator, a counter torque is produced. This counter torque functions as a brake on the vehicle.

Although regenerative braking of the type just described is a useful feature, it may in some situations be harmful or undesirable. For example, the vehicle's battery may already be nearly or fully charged. An over-voltage condition can damage the system, so when the battery is already nearly or fully charged, standard regenerative braking is undesirable.

Control systems described herein employ a technique to reduce and/or dispose of this excess energy to prevent over-voltage damage when the vehicle is regenerating power. Specifically, energy is redirected using a version of Field Oriented Control (FOC) (also referred to as Vector Control). When the vehicle is operating, a flux current (AKA direct current) is defined having a vector aligned with the rotating rotor flux angle, and a quadrature current is defined at 90 degrees from the rotating rotor flux angle. Systems of the present disclosure redirect energy by manipulating the flux current independently from the quadrature current.

During normal operations, quadrature current is controlled in accordance with desired motor torque, while flux current is typically set to zero, e.g., so as not to counteract the motor's permanent magnets. However, in a possible over-voltage situation, systems of the present disclosure are configured to automatically weaken the motor flux by adjusting the flux current. This has two effects. First, the current used to weaken the flux is itself a load on the system, therefore opposing battery regeneration. Second, by weakening the flux, the CEMF is reduced, such that the CEMF does not exceed the battery voltage as much. Accordingly, the motor generates less of the current that would otherwise be fed into the battery.

Aspects of the present control systems may be embodied as a computer method, computer system, or computer program product. Accordingly, aspects of the present control systems may include processing logic and may take the form of an entirely hardware embodiment, an entirely software embodiment (including firmware, resident software, microcode, and the like), or an embodiment combining software and hardware aspects, all of which may generally be referred to herein as a "circuit," "module," or "system." Furthermore, aspects of the present control systems may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the present control systems may be written in one or any combination of programming languages, including an object-oriented programming language such as Java, C++, and/or the like, and conventional procedural programming languages, such as C. Mobile apps may be developed using any suitable language, including those previously mentioned, as well as Objective-C, Swift, C#, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the present control systems are described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block(s). In some examples, machine-readable instructions may be programmed onto a programmable logic device, such as a field programmable gate array (FPGA).

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block(s).

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the present control systems. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Examples, Components, and Alternatives

The following sections describe selected aspects of exemplary electric vehicles and motor control systems therefor, as well as related systems and/or methods. The examples in these sections are intended for illustration and should not be interpreted as limiting the entire scope of the present disclosure. Each section may include one or more distinct embodiments or examples, and/or contextual or related information, function, and/or structure.

A. Illustrative Vehicle

FIG. 1 depicts an illustrative electric vehicle 10 that may be suitable for use with an FOC-based over-voltage protection system in accordance with aspects of the present disclosure. Other electric vehicles may also be suitable for the energy recovery control systems described herein.

Vehicle 10 is a one-wheeled, self-stabilizing skateboard substantially similar to the electric vehicles described in U.S. Pat. No. 9,101,817 (the '817 patent), the entirety of which is hereby incorporated herein for all purposes. Accordingly, vehicle 10 includes a board 12 having a frame 14 supporting a first deck portion 16 and a second deck portion 18. Each deck portion 16, 18 is configured to receive a left or right foot of a rider oriented generally perpendicular to a direction of travel of the board (see FIG. 2), said direction of travel generally indicated at 20.

Vehicle 10 also includes a wheel assembly 22. Wheel assembly 22 includes a rotatable ground-contacting element 24 (e.g., a tire, wheel, or continuous track) disposed between and extending above the first and second deck portions 16, 18, and a hub motor 26 configured to rotate ground-contacting element 24 to propel the vehicle. As shown in FIG. 1, vehicle 10 may include exactly one ground-contacting element.

Frame 14 may include any suitable structure configured to rigidly support the deck portions and to be coupled to an axle of the wheel assembly, such that the weight of a rider may be supported on tiltable board 12 having a fulcrum at the wheel assembly axle. Frame 14 may include one or more frame members 28, on which deck portions 16 and 18 may be mounted, and which may further support additional elements and features of the vehicle, such as a charging port 30, and end bumpers 32, 34, as well as lighting assemblies, battery and electrical systems, electronics, controllers, and the like (see, e.g., FIGS. 4-11 and corresponding description).

Deck portions 16 and 18 may include any suitable structures configured to support the feet of a rider, such as non-skid surfaces, as well as vehicle-control features, such as a rider detection system. In some examples, a rider detection system includes a strain gauge rider detection system. Illustrative deck portions, including other suitable rider detection systems, are described in the '817 patent, as well as in U.S. patent application Ser. No. 14/934,024, the entirety of which is hereby included herein for all purposes.

A shaft 36 of an axle portion of hub motor 26 is coupled to frame 14, as shown in FIG. 1. For example, the shaft may be directly attached to frame 14, or may be coupled to the frame through a connection or mounting block 40 (also referred to as an axle mount). Shaft 36 may be bolted or otherwise affixed to mounting block 40, which in turn may be bolted or affixed to frame 14 (e.g., by bolts 42, 44). A through hole 46 may be provided in frame 14 for access to the connector of shaft 36 to block 40.

Figure 2:
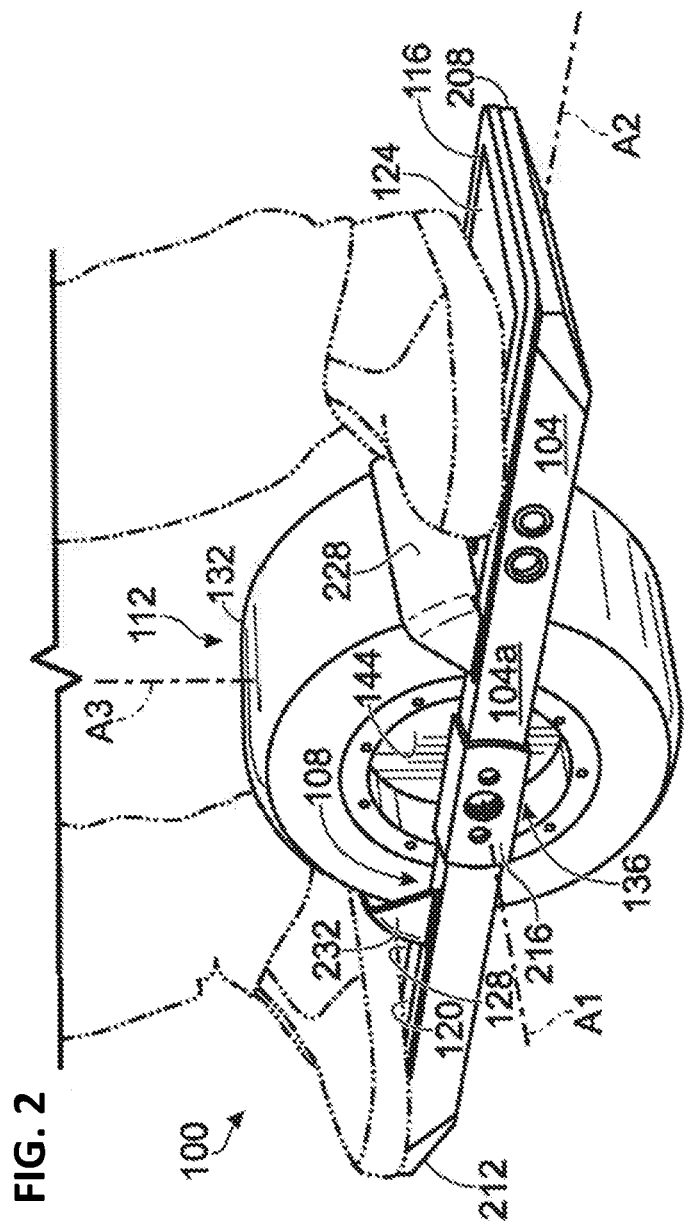
FIG. 2 is an isometric view of another illustrative one-wheeled electric vehicle showing a rider mounted thereon.
Figure 3:
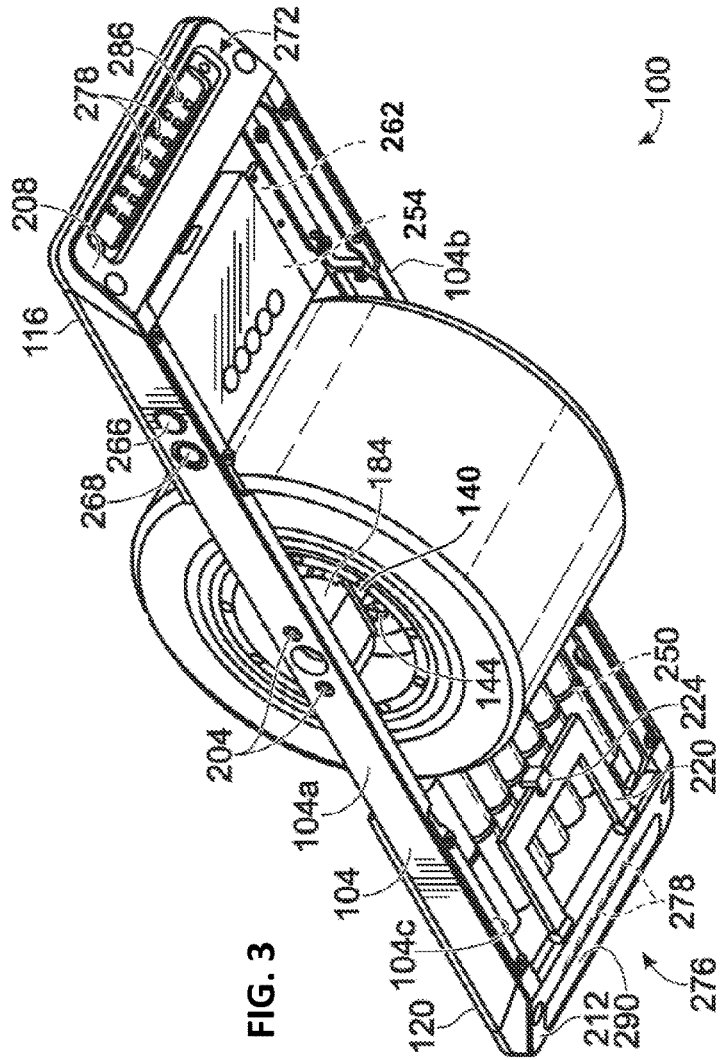
FIG. 3 is a bottom oblique isometric view of the vehicle of FIG. 2.

FIGS. 2-3 depict another example of a self-balancing electric vehicle substantially similar to vehicle 10, indicated at 100. Vehicle 100 includes a board (or foot deck, or frame, or platform) 104 having an opening 108 for receiving a wheel assembly 112 between first and second deck portions (or footpads) 116, 120. First and second deck portions 116, 120 may be of the same physical piece, or may be separate pieces. First and second deck portions 116, 120 may be included in board 104. First and second deck portions 116, 120 are each configured to support a rider's foot. For example, first and second deck portions 116, 120 may each be configured to receive a left or a right foot of the rider.

Board/frame 104 may define a plane. First deck portion 116 is mounted to frame 104 and configured to support a first foot of the rider. Second deck portion 120 is mounted to frame 104 and configured to support a second foot of the rider.

Wheel assembly 112 is disposed between first and second deck portions 116, 120. First and second deck portions 116, 120 may be located on opposite sides of wheel assembly 112 with board 104 being dimensioned to approximate a skateboard. In other embodiments, the board may approximate a longboard skateboard, snowboard, surfboard, or may be otherwise desirably dimensioned. In some examples, deck portions 116, 120 of board 104 may be covered with non-slip material portions 124, 128 (e.g., 'grip tape') to aid in rider control.

Wheel assembly 112 includes a ground-contacting element (e.g., a tire, wheel, or continuous track) 132. As shown, vehicle 100 includes exactly one ground-contacting element 132, and the exactly one ground-contacting element is disposed between first and second deck portions 116, 120. Ground-contacting element 132 is coupled to a motor assembly 136. Motor assembly 136 is mounted to board 104. Motor assembly 136 includes an axle 140, which is coupled to board 104 by one or more axle mounts and one or more fasteners, such as a plurality of bolts. Motor assembly 136 may be configured to rotate ground-contacting element 132 around (or about) axle 140 to propel vehicle 100. For example, motor assembly 136 may include an electric motor, such as a hub motor 144, configured to rotate ground-contacting element 132 about axle 140 to propel vehicle 100 along the ground.

Vehicle 100 has a pitch axis A1, a roll axis A2, and a yaw axis A3 (see FIG. 2). Pitch axis A1 is the axis about which tire 132 is rotated by motor assembly 136. For example, pitch axis A1 may pass through axle 140 (e.g., pitch axis A1 may be parallel to and aligned with an elongate direction of axle 140). Roll axis A2 is perpendicular to pitch axis A1, and may substantially extend in a direction in which vehicle 100 may be propelled by motor assembly 136. For example, roll axis A2 may extend in an elongate direction of board 104. Yaw axis A3 is perpendicular to pitch axis A1 and to roll axis A2. For example, yaw axis A3 may be normal to a plane defined by deck portions 116, 120, as shown in FIG. 2.

Wheel 132 may be mounted to frame 104 between deck portions 116, 120, and may extend above and below the plane defined by frame 104. Wheel 132 may be configured to rotate about an axis (e.g., pitch axis A1) lying in the plane. In addition, roll axis A2 may lie in the plane defined by frame 104. In some embodiments, the pitch and roll axes may define the plane.

Tire 132 may be wide enough in a heel-toe direction (e.g., in a direction parallel to pitch axis A1), so that the rider can balance in the heel-toe direction using his or her own balance. Tire 132 may be tubeless, or may be used with an inner tube. Tire 132 may be a non-pneumatic tire. For example, tire 132 may be "airless", solid, and/or made of foam. Tire 132 may have a profile such that the rider can lean vehicle 100 over an edge of tire 132 (and/or pivot the board about roll axis A2 and/or yaw axis A3) through heel and/or toe pressure to corner vehicle 100.

Hub motor 144 may be mounted within tire (or wheel) 132 and may be internally geared or may be direct-drive. The use of a hub motor may eliminate chains and belts, and may enable a form factor that considerably improves maneuverability, weight distribution, and aesthetics. Mounting tire 132 onto hub motor 144 may be accomplished by either a split-rim design that may use hub adapters, which may be bolted on to hub motor 144, or by casting a housing of the hub motor such that it provides mounting flanges for a tire bead directly on the housing of the hub motor.

With continuing reference to FIGS. 2-3, a first skid pad 208 may be integrated into (or connected to) a first end of board 104 proximal first deck portion 116, and a second skid pad 212 may be integrated into (or connected to) a second end of board 104 proximal second deck portion 120. Skid pads 208, 212 may be replaceable and/or selectively removable. For example, the skid pads may include replaceable polymer parts or components. In some embodiments, the skid pads may be configured to allow the rider to bring vehicle 100 to a stop in an angled orientation (e.g., by setting one end of the board against the ground after the rider removes their foot from a rider detection device or switch, which is described below in further detail). The respective skid pad may be worn by abrasion with the surface of the ground as that end of the board is set against (or brought into contact with) the ground.

Vehicle 100 may include one or more side-skid pads configured to protect the paint or other finish on board 104, and/or otherwise protect vehicle 100 if, for example, vehicle 100 is flipped on its side and/or slides along the ground on its side. For example, the one or more side-skid pads may be removably connected to one or more opposing longitudinal sides of the board (e.g., extending substantially parallel to the roll axis). FIG. 2 shows a first side-skid pad 216 connected to a first longitudinal side 104a of board 104. In FIG. 3, side-skid pad 216 has been removed from first longitudinal side 104a. A second side-skid pad (not shown) may be similarly removably connected to a second longitudinal side 104b (see FIG. 3) of board 104 opposite first longitudinal side 104a. The side-skid pads may be incorporated into the electric vehicle as one or more removable parts or components, and/or may be or include replaceable polymer parts or components.

A removable connection of the skid pads and/or the side-skid pads to the board may enable the rider (or other user) to selectively remove one or more of these pads that become worn with abrasion, and/or replace the worn pad(s) with one or more replacement pads.

As shown in FIG. 3, vehicle 100 may include a handle 220. Handle 220 may be disposed on an underside 104c of board 104. Handle 220 may be integrated into a housing or enclosure of one or more of the electrical components.

In some embodiments, handle 220 may be operable between IN and OUT positions. For example, handle 220 may be pivotally connected to board 104, with the IN position corresponding to handle 220 substantially flush with underside 104c of board 104, and the OUT position corresponding to handle 220 pivoted (or folded) away from underside 104 such that handle 220 projects away from deck portion 120.

Vehicle 100 may include any suitable mechanism, device, or structure for releasing handle 220 from the IN position. For example, vehicle 100 may include a locking mechanism 224 that is configured to operate handle 220 between a LOCKED state corresponding to handle 220 being prevented from moving from the IN position to the OUT position, and an UNLOCKED state corresponding to handle 220 being allowed to move from the IN position to the OUT position. In some embodiments, the rider may press locking mechanism 224 to operate the handle from the LOCK state to the UNLOCKED state. The rider may manually move handle 220 from the IN position to the OUT position. The rider may grasp handle 220, lift vehicle 100 off of the ground, and carry vehicle 100 from one location to another.

In some embodiments, handle 220 may include a biasing mechanism, such as a spring, that automatically forces handle 220 to the OUT position when operated to the UNLOCKED state. In some embodiments, locking mechanism 224 may be configured to selectively lock handle 220 in the OUT position.

Vehicle 100 may include any suitable apparatus, device, mechanism, and/or structure for preventing water, dirt, or other road debris from being transferred by the ground-contacting element to the rider. For example, as shown in FIG. 2, vehicle 100 may include first and second partial fender portions 228, 232. Portion 228 is shown coupled to first deck portion 116, and portion 232 is shown coupled to second deck portion 120. Portion 228 may prevent debris from being transferred from tire 132 to a portion of the rider positioned on or adjacent deck portion 116, such as when tire 132 is rotated about pitch axis A1 in a counter-clockwise direction. Portion 232 may prevent debris from being transferred from tire 132 to a portion of the rider positioned on or adjacent deck portion 120, such as when tire 132 is rotated about pitch axis A1 in a clockwise direction.

Additionally and/or alternatively, vehicle 100 may include a full fender (not shown). A full fender may be configured to prevent a transfer of debris from the ground-contacting element to the rider. A full fender and/or fender portions 228, 232 may be attached to at least one of deck portions 116, 120 and configured to prevent water traversed by wheel 132 from splashing onto the rider. A suitable fender may be attached to one or both of deck portions 116, 120, and may substantially entirely separate wheel 132 from the rider.

Fenders may include a resilient fender. For example, fenders may include (or be) a sheet of substantially flexible or resilient material, such as plastic. A first side of the resilient material may be coupled to deck portion 116 (or board 104 proximate deck portion 116), and a second side of the resilient material may be coupled to deck portion 120 (or board 104 proximate deck portion 120).

As indicated in FIG. 3, the one or more electrical components of vehicle 100 may include a power supply 250, a motor controller 254, a rider detection device 262, a power switch 266, and a charge plug 268. Power supply 250 may include one or more batteries (e.g., rechargeable batteries) which may be re-chargeable, such as one or more lithium batteries that are relatively light in weight and have a relatively high power density. In some examples, power supply 250 may include one or more lithium iron phosphate batteries, one or more lithium polymer batteries, one or more lithium cobalt batteries, one or more lithium manganese batteries, or a combination thereof. For example, power supply 250 may include sixteen (16) A123 lithium iron phosphate batteries (e.g., size 26650). The batteries of power supply 250 may be arranged in a 16S1P configuration. A microcontroller 269 and/or one or more sensors (or at least one sensor) 270 may be included in or connected to motor controller 254 (see FIG. 4). At least one of sensors 270 may be configured to measure orientation information (or an orientation) of board 104. For example, sensors 270 may be configured to sense movement of board 104 about and/or along the pitch, roll, and/or yaw axes. The motor may be configured to cause rotation of wheel 132 based on the orientation of board 104. In particular, motor controller 254 may be configured to receive orientation information measured by the at least one sensor of sensors 270 and to cause motor assembly 254 to propel the electric vehicle based on the orientation information. For example, motor controller 254 may be configured to drive hub motor 144 based on received sensed movement of board 104 from sensors 270 via microcontroller 269 to propel and/or actively balance vehicle 100.

One or more of the electrical components may be integrated into board 104. For example, board 104 may include a first environmental enclosure that may house power supply 250, and a second environmental enclosure that may house motor controller 254, and rider detection device 262. The environmental enclosures may protect the one or more electrical components from being damaged, such as by water ingress.

Vehicle 100 may include one or more light assemblies, such as one or more headlight and/or taillight assemblies. For example, a first headlight/taillight assembly (or first light assembly) 272 may be disposed on or at (and/or connected to) a first end portion of board 104 (e.g., at a distal end portion of first deck portion 116), and a second headlight/taillight assembly 276 may be disposed on or at (and/or connected to) a second end portion of board 104 (e.g., at a distal end portion of second deck portion 120). The second end portion of board 104 may be opposite the first end portion.

Headlight/taillight assemblies 272, 276 may be configured to reversibly light vehicle 100. For example, assemblies 272, 276 may indicate the direction that vehicle 100 is moving by changing color. For example, the headlight/taillight assemblies may each include one or more high output red and white LEDs (or other suitable one or more illuminators) 278 configured to receive data from microcontroller 269 (and/or a pitch sensor or sensors 270, such as a 3-axis gyro 280—see FIG. 4) and automatically change color from red to white (or white to red, or a first color to a second color) based on the direction of movement of vehicle 100, with white LEDs (or a first color) shining in the direction of motion and red LEDs (or a second color) shining backward (e.g., opposite the direction of motion). For example, one or more of the headlight/taillight assemblies (e.g., their respective illuminators) may be connected to microcontroller 269 via an LED driver, which may be included in or coupled to motor controller 254. In some embodiments, the illuminators may include RGB/RGBW LEDs.

Illuminators 278 may be located in and/or protected by skid pads 208, 212, as shown in FIG. 3. For example, skid pads 208, 212 may include respective apertures 286, 290. Illuminators 278 may be disposed in and shine through respective apertures 286, 290. Apertures 286, 290 may be dimensioned to prevent illuminators 278 from contacting the ground. For example, apertures 286, 290 may each have a depth that is greater than a height of illuminators 278. In some embodiments, the illuminators may be separable from the associated skid pad, so that the skid pads may be removed without removing the illuminators.

As shown in FIG. 3, first skid pad 208 and a first illuminator 278 are disposed at a distal end of first deck portion 116, and second skid pad 212 and a second illuminator 278 are disposed at a distal end of second deck portion 120. Each of skid pads may include an aperture (e.g., skid pad 208 may include aperture 286, and skid pad 212 may include aperture 290, as mentioned above) configured to allow light from the corresponding illuminator to shine through while preventing the illuminator from contacting the ground.

B. Illustrative Control System

Figure 4:
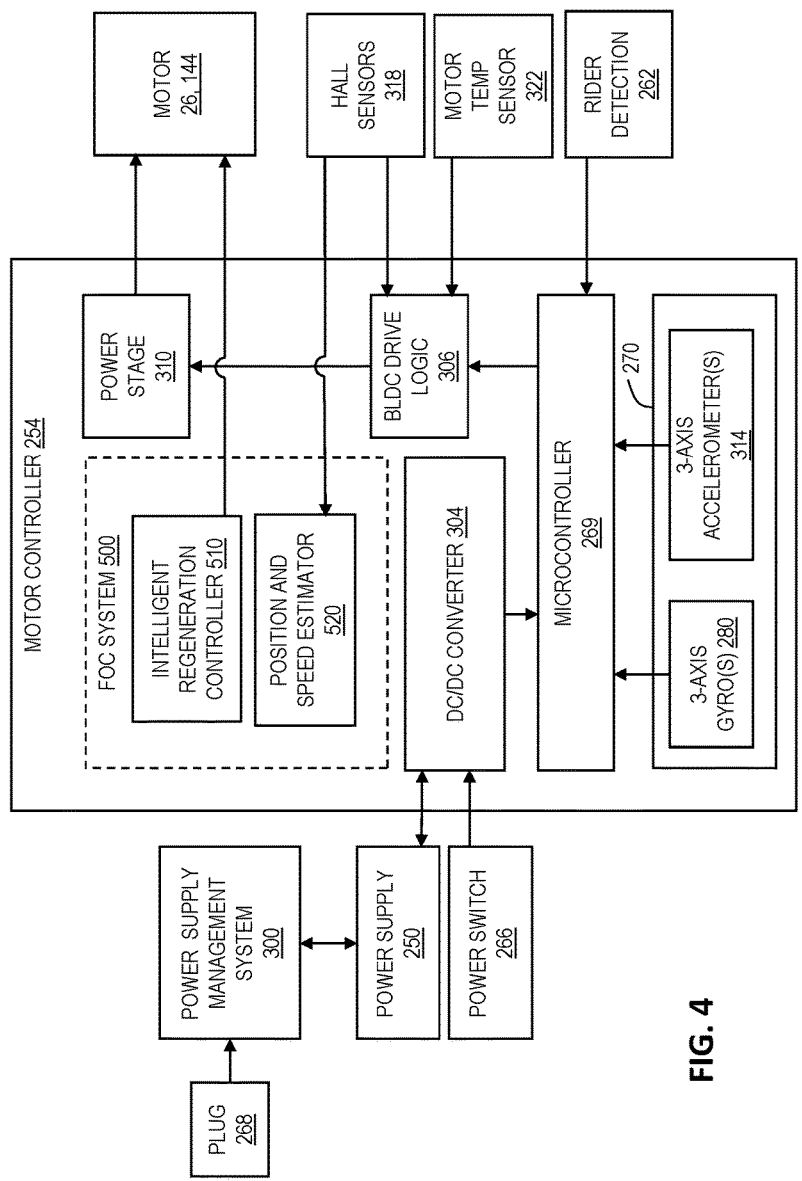
FIG. 4 is a schematic diagram of illustrative electrical controls of the vehicles of FIGS. 1-3.

FIG. 4 shows a block diagram of various illustrative electrical components of vehicle 10 (or 100), including onboard controls, some or all of which may be included in vehicle 10 (or 100). The electrical components may include a power supply management system 300, a direct current to direct current (DC/DC) converter 304, a brushless direct current (BLDC) drive logic 306, a power stage 310, one or more 3-axis accelerometer 314, one or more Hall sensors 318, and/or a motor temperature sensor 322. DC/DC converter 304, BLDC drive logic 306, and power stage 310 may be included in and/or coupled to motor controller 254. In some examples, motor controller 254 may comprise a variable-frequency drive and/or any other suitable drive. Accelerometer(s) 314 may be included in sensors 270.

Active balancing (or self-stabilization) of the electric vehicle may be achieved through the use of a feedback control loop or mechanism. The feedback control mechanism may include sensors 270, which may be electrically coupled to and/or included in motor controller 254. Preferably, the feedback control mechanism includes a Proportional-Integral-Derivative (PID) control scheme using one or more gyros (e.g., gyro(s) 280) and one or more accelerometers (e.g., accelerometer(s) 314). Gyro 280 may be configured to measure a pivoting of the foot deck about its pitch axis. Gyro 280 and accelerometer 314 may be collectively configured to estimate (or measure, or sense) a lean angle of board 104, such as an orientation of the foot deck about the pitch, roll and/or yaw axes. In some embodiments, the gyro and accelerometer 314 may be collectively configured to sense orientation information sufficient to estimate the lean angle of frame 104 (or 14) including pivotation about the pitch, roll and/or yaw axes.

As mentioned above, orientation information of board 104 may be measured (or sensed) by gyro 280 and accelerometer 314. The respective measurements (or sense signals) from gyro 280 and accelerometer 314 may be combined using a complementary or Kalman filter to estimate a lean angle of board 104 (e.g., pivoting of board 104 about the pitch, roll, and/or yaw axes, with pivoting about the pitch axis corresponding to a pitch angle (about axle 140 or 36), pivoting about the roll axis corresponding to a roll or heel-toe angle, and pivoting about the yaw axis corresponding to a side-to-side yaw angle) while filtering out the impacts of bumps, road texture and disturbances due to steering inputs. For example, gyro 280 and accelerometer 314 may be connected to microcontroller 269, which may be configured to correspondingly measure movement of board 104 about and along the pitch, roll, and/or yaw axes.

Alternatively, the electronic vehicle may include any suitable sensor and feedback control loop configured to self-stabilize a vehicle, such as a 1-axis gyro configured to measure pivotation of the board about the pitch axis, a 1-axis accelerometer configured to measure a gravity vector, and/or any other suitable feedback control loop, such as a closed-loop transfer function. Additional accelerometer and gyro axes may allow improved performance and functionality, such as detecting if the board has rolled over on its side or if the rider is making a turn.

The feedback control loop may be configured to drive motor 26, 144 to reduce an angle of board 12, 104 with respect to the ground. For example, if a rider were to angle board 12 downward, so that first deck portion 16 was 'lower' than second deck portion 18 (e.g., if the rider pivoted board 12 counterclockwise (CCW) about axle 34 in FIG. 1), then the feedback loop may drive motor 26 to cause CCW rotation of tire 24 about the pitch axis (i.e., axle 36) and a clockwise force on board 12.

Thus, motion of the electric vehicle may be achieved by the rider leaning his or her weight toward a selected (e.g., "front") foot. Similarly, deceleration may be achieved by the rider leaning toward the other (e.g., "back" foot). Regenerative braking can be used to slow the vehicle, as discussed further below. Sustained operation may be achieved in either direction by the rider maintaining their lean toward either selected foot.

As indicated in FIG. 4, microcontroller 269 may be configured to send a signal to brushless DC (BLDC) drive logic 306, which may communicate information relating to the orientation and motion of board 104. BLDC drive logic 306 may then interpret the signal and communicate with power stage 310 to drive motor 144 accordingly. Hall sensors 318 may send a signal to the BLDC drive logic to provide feedback regarding a substantially instantaneous rotational rate of the rotor of motor 144. Motor temperature sensor 322 may be configured to measure a temperature of motor 144 and send this measured temperature to logic 306. Logic 306 may limit an amount of power supplied to motor 144 based on the measured temperature of motor 144 to prevent the motor from overheating.

Certain modifications to the PID loop or other suitable feedback control loop may be incorporated to improve performance and safety of the electric vehicle. For example, integral windup may be prevented by limiting a maximum integrator value, and an exponential function may be applied to a pitch error angle (e.g., a measured or estimated pitch angle of board 104).

Alternatively or additionally, some embodiments may include neural network control, fuzzy control, genetic algorithm control, linear-quadratic regulator control, state-dependent Riccati equation control, and/or other control algorithms. In some embodiments, absolute or relative encoders may be incorporated to provide feedback on motor position.

Figure 5:
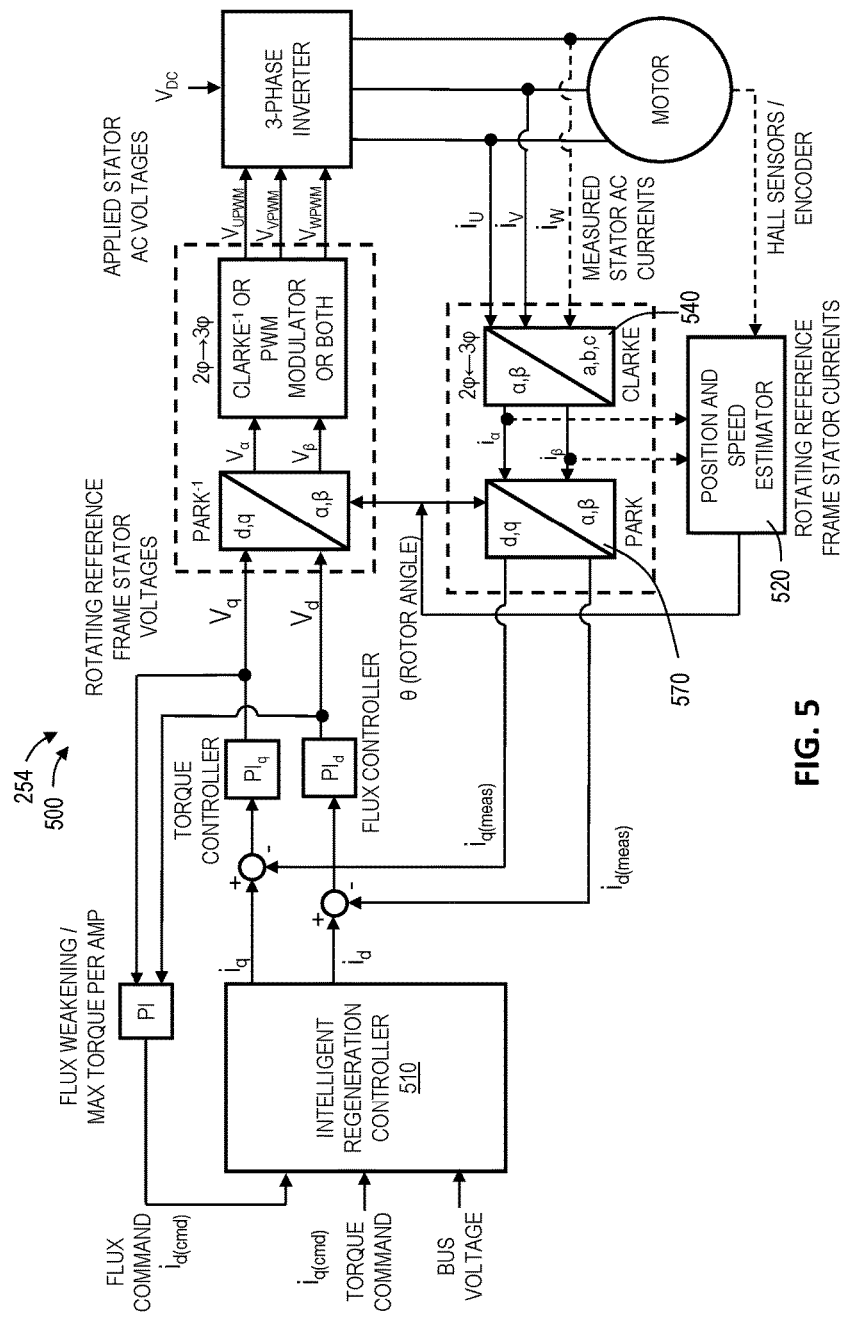
FIG. 5 is a schematic diagram of an illustrative Field Oriented Control (FOC) system in accordance with aspects of the present disclosure.

In some embodiments, a field-oriented control (FOC) or vector control system may be incorporated into the motor controller (e.g., in microcontroller 269, drive logic 306, and/or any other suitable processing logic of the motor controller). A suitable FOC system is depicted in FIG. 5. As described below with respect to FIGS. 5-12, this FOC system may be configured to divert excess regenerative current, thereby acting as a protective mechanism for the battery.

As mentioned above, during turning, the pitch angle can be modulated by the heel-toe angle (e.g., pivoting of the board about the roll axis), which may improve performance and prevent a front inside edge of board 104 from touching the ground. In some embodiments, the feedback loop may be configured to increase, decrease, or otherwise modulate the rotational rate of the tire if the board is pivoted about the roll and/or yaw axes. This modulation of the rotational rate of the tire may exert an increased normal force between a portion of the board and the rider, and may provide the rider with a sense of "carving" when turning, similar to the feel of carving a snowboard through snow or a surfboard through water.

Once the rider has suitably positioned themselves on the board, the control loop may be configured to not activate until the rider moves the board to a predetermined orientation. For example, an algorithm may be incorporated into the feedback control loop, such that the control loop is not active (e.g., does not drive the motor) until the rider uses their weight to bring the board up to an approximately level orientation (e.g., 0 degree pitch angle). Once this predetermined orientation is detected, the feedback control loop may be enabled (or activated) to balance the electric vehicle and to facilitate a transition of the electric vehicle from a stationary mode (or configuration, or state, or orientation) to a moving mode (or configuration, or state, or orientation).

With continued reference to FIG. 4, the various electrical components may be configured to manage power supply 250. For example, power supply management system 300 may be a battery management system configured to protect batteries of power supply 250 from being overcharged, over-discharged, and/or short-circuited. System 300 may monitor battery health, may monitor a state of charge in power supply 250, and/or may increase the safety of the vehicle. Power supply management system 300 may be connected between a charge plug 268 of vehicle 10 and power supply 250. The rider (or other user) may couple a charger to plug 268 and re-charge power supply 250 via system 300.

In operation, power switch 266 may be activated (e.g., by the rider). Activation of switch 266 may send a power-on signal to converter 304. In response to the power-on signal, converter 304 may convert direct current from a first voltage level provided by power supply 250 to one or more other voltage levels. The other voltage levels may be different than the first voltage level. Converter 304 may be connected to the other electrical components via one or more electrical connections to provide these electrical components with suitable voltages.

Converter 304 (or other suitable circuitry) may transmit the power-on signal to microcontroller 269. In response to the power-on signal, microcontroller may initialize sensors 270, and rider detection device 262.

The electric vehicle may include one or more safety mechanisms, such as power switch 266 and/or rider detection device 262 to ensure that the rider is on the board before engaging the feedback control loop. In some embodiments, rider detection device 262 may be configured to determine if the rider's feet are disposed on the foot deck, and to send a signal causing motor 144 to enter an active state when the rider's feet are determined to be disposed on the foot deck.

Rider detection device 262 may include any suitable mechanism, structure, or apparatus for determining whether the rider is on the electric vehicle. For example, device 262 may include one or more mechanical buttons, one or more capacitive sensors, one or more inductive sensors, one or more optical switches, one or more force-resistive sensors, and/or one or more strain gauges. Rider detection device 262 may be located on or under either or both of first and second deck portions 16, 18 or 116, 120 (see FIGS. 1-2). In some examples, the one or more mechanical buttons or other devices may be pressed directly (e.g., if on the deck portions), or indirectly (e.g., if under the deck portions), to sense whether the rider is on board 104. In some examples, the one or more capacitive sensors and/or the one or more inductive sensors may be located on or near a surface of either or both of the deck portions, and may correspondingly detect whether the rider is on the board via a change in capacitance or a change in inductance. In some examples, the one or more optical switches may be located on or near the surface of either or both of the deck portions. The one or more optical switches may detect whether the rider is on the board based on an optical signal. In some examples, the one or more strain gauges may be configured to measure board or axle flex imparted by the rider's feet to detect whether the rider is on the board. In some embodiments, device 262 may include a hand-held "dead-man" switch.

If device 262 detects that the rider is suitably positioned on the electric vehicle, then device 262 may send a rider-present signal to microcontroller 269. The rider-present signal may be the signal causing motor 26, 144 to enter the active state. In response to the rider-present signal (and/or the board being moved to the level orientation), microcontroller 269 may activate the feedback control loop for driving motor 144. For example, in response to the rider-present signal, microcontroller 269 may send board orientation information (or measurement data) from sensors 270 to logic 306 for powering motor 26, 144 via power stage 310.

In some embodiments, if device 262 detects that the rider is no longer suitably positioned or present on the electric vehicle, device 262 may send a rider-not-present signal to microcontroller 269. In response to the rider-not-present signal, circuitry of vehicle 10 (e.g., microcontroller 269, logic 306, and/or power stage 310) may be configured to reduce a rotational rate of the rotor relative to the stator to bring vehicle 10 to a stop. For example, the electric coils of the rotor may be selectively powered to reduce the rotational rate of the rotor. In some embodiments, in response to the rider-not-present signal, the circuitry may be configured to energize the electric coils with a relatively strong and/or substantially continuously constant voltage, to lock the rotor relative to the stator, to prevent the rotor from rotating relative to the stator, and/or to bring the rotor to a sudden stop.

In some embodiments, the vehicle may be configured to actively drive motor 26, 144 even though the rider may not be present on the vehicle (e.g., temporarily), which may allow the rider to perform various tricks. For example, device 262 may be configured to delay sending the rider-not-present signal to the microcontroller for a predetermined duration of time, and/or the microcontroller may be configured to delay sending the signal to logic 306 to cut power to the motor for a predetermined duration of time.

C. Illustrative Motor Controller Using Field-Oriented Control

FIGS. 5-13 relate to a field-oriented control (FOC) system and algorithm configured to manage stator voltages to run a BLDC motor of a vehicle, such as vehicles 10, 100 described in Section A. The FOC system described below may be part of or coupled to a motor controller, such as motor controller 254 described in Section B.

In general, FOC is used to ensure maximum torque is applied for a given amount of current, by maximizing the net current vector in a direction 90-degrees with respect to the rotor flux. This is accomplished by controlling two orthogonal component vectors: a direct current ($i_d$) pointed along the rotor flux axis and a quadrature current ($i_q$) pointed 90 degrees from the direct current vector. As mentioned above, the direct current may be referred to as the flux current.

The orientations of the vectors mean that maximizing the quadrature current and minimizing the direct current would cause the most efficient overall net current vector (i.e., at 90 degrees from the rotor flux). As described in the Overview above, motor controllers of the present disclosure are further configured to operate the motor inefficiently when the battery is in danger of an over-voltage condition. To do this, the controller selectively causes the direct (flux) current to be raised when CEMF is greater than battery voltage, thereby both weakening the rotor flux (and CEMF) and dumping excess current along a non-torque-inducing vector.

Figure 11:
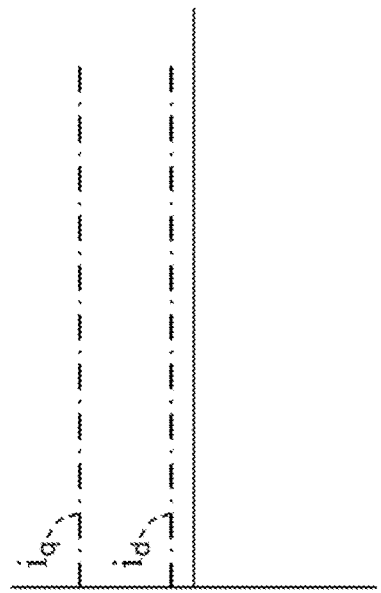
FIG. 11 is a schematic diagram depicting the variation with time of two illustrative currents associated with the reference system of FIG. 10.
Figure 10:
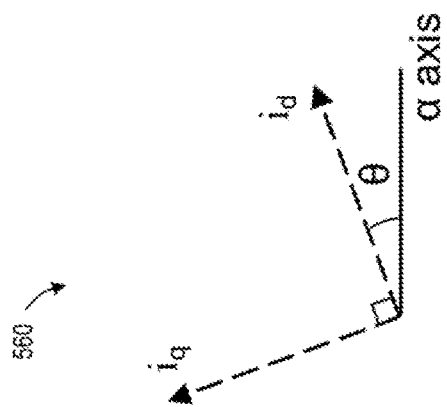
FIG. 10 is a schematic diagram depicting an illustrative rotating two-axis reference system used by the FOC system of FIG. 5.
Figure 12:
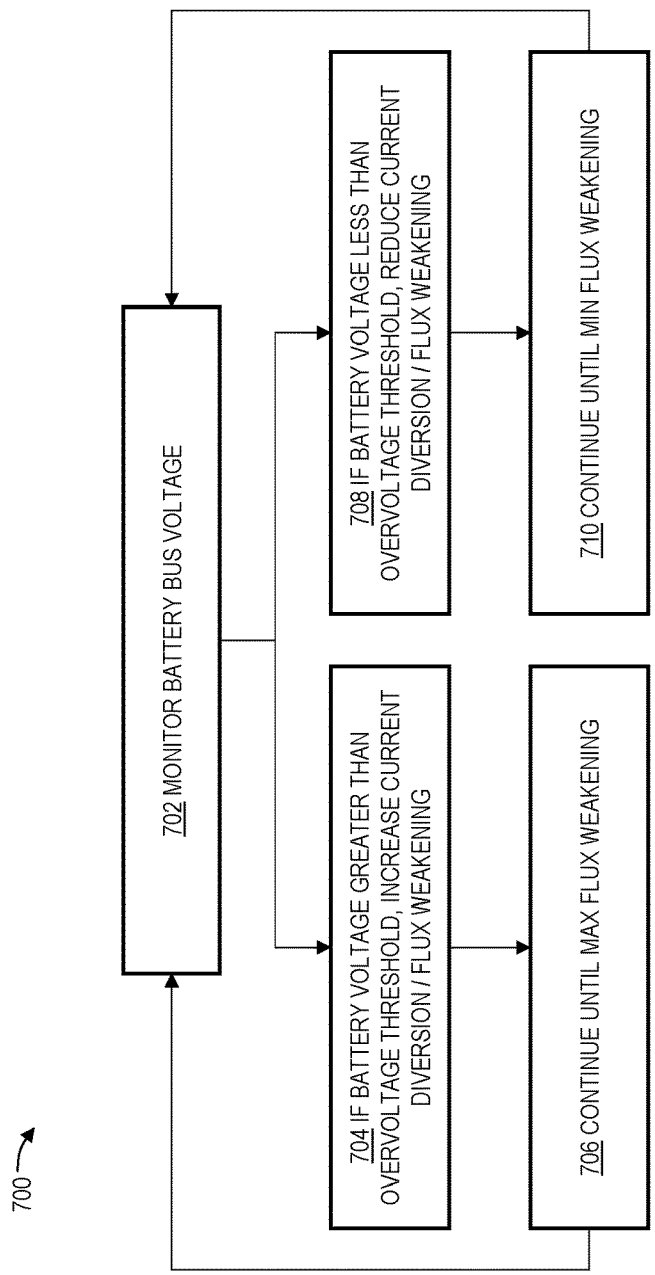
FIG. 12 is a flowchart depicting steps of an illustrative method for limiting over-voltage conditions in an electric vehicle using an FOC system according to the present teachings.
Figure 13:
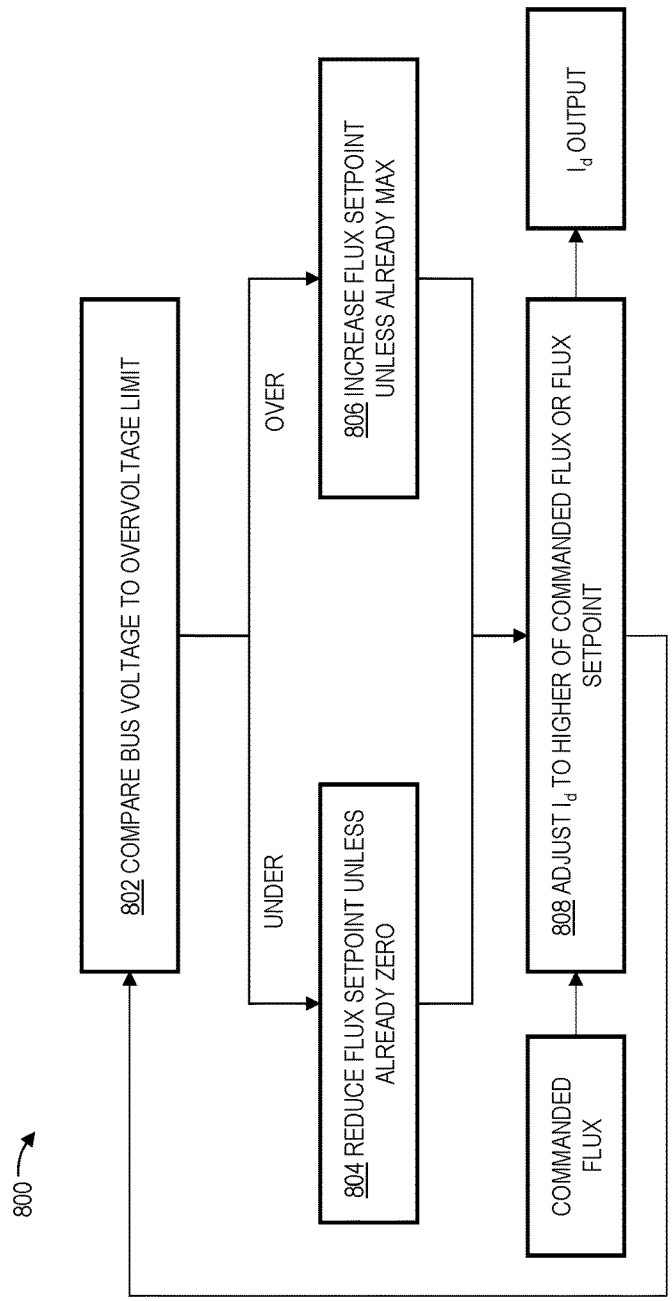
FIG. 13 is a flowchart depicting steps of another illustrative method for limiting over-voltage conditions in an electric vehicle using the FOC system according to the present teachings.

FIG. 5 is a block diagram of an illustrative FOC system 500 (also referred to as a FOC scheme or FOC platform) suitable for use with aspects of the present disclosure. FIGS. 6-11 depict the various vector current frameworks discussed below. FIGS. 12 and 13 depict steps of illustrative methods or algorithms (700, 800) used by FOC system 500.

Figure 7:
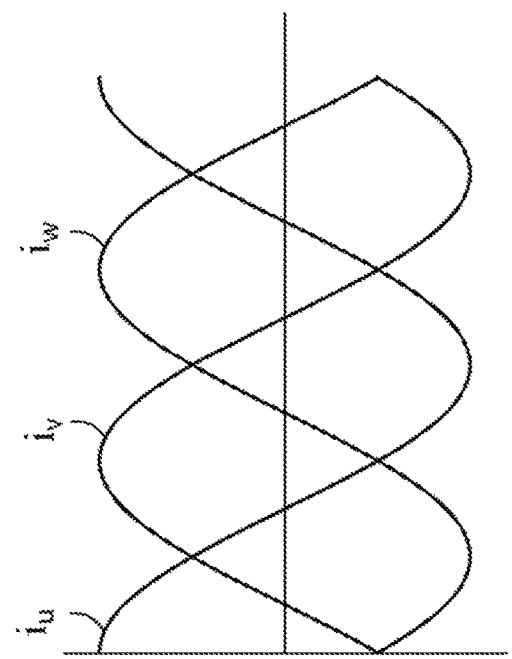
FIG. 7 is a schematic diagram depicting the variation over time of three illustrative currents associated with the reference system of FIG. 6.
Figure 6:
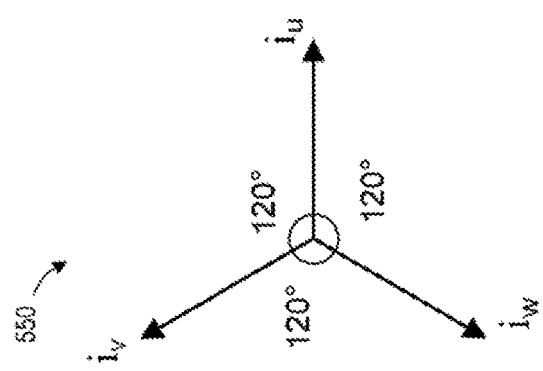
FIG. 6 is a schematic diagram depicting an illustrative three-axis reference system used by the FOC system of FIG. 5.

With reference to FIGS. 5 and 6-7, each of the three phase currents of the motor may be controlled by controlling applied stator voltages, namely Vu, Vv, and Vw. To this end, stator currents (iu, iv, and iw) are measured, usually by measuring two of the currents and calculating the third. These three currents comprise vectors that can be added together to determine the resulting net current vector. Controlling the three currents therefore controls the net current vector, and a relationship between the net current vector and the rotor flux vector determines how much torque is experienced by the rotor. Specifically, maximum motor torque is achieved when the net stator current vector is ninety degrees from the rotor flux.

Figure 9:
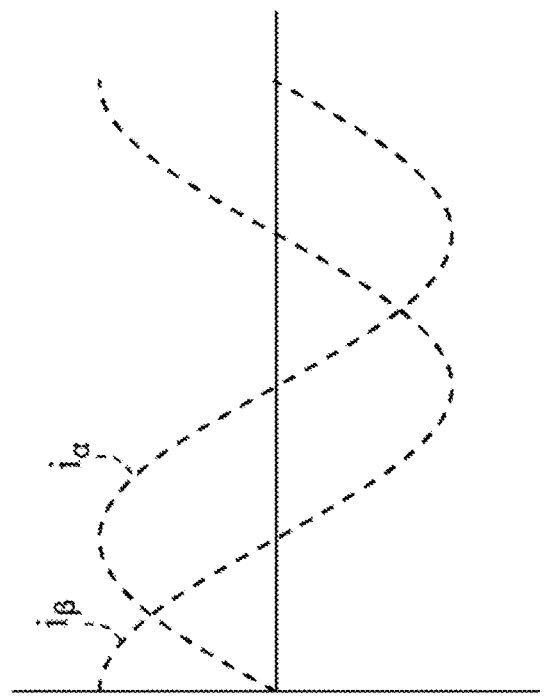
FIG. 9 is a schematic diagram depicting the variation with time of two illustrative currents associated with the reference system of FIG. 8.
Figure 8:
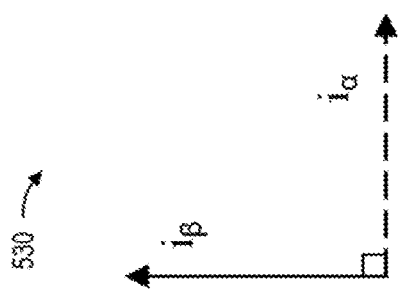
FIG. 8 is a schematic diagram depicting an illustrative two-axis reference system used by the FOC system of FIG. 5.

Controllers of this type are generally configured to maintain the net current vector at 90 degrees from the rotor flux, and to control the amount of motor torque by regulating the amplitude of the net current vector. Accordingly, the controller (e.g., a position and speed estimator module 520) measures the rotor position (e.g., using Hall sensors, an encoder, a resolver, a sensorless approach, etc.), which determines the rotor flux position, and then the controller adjusts the net current vector to be pointed 90 degrees from the rotor flux position. Rather than directly determining which values of the three stator voltages to apply, which is complex and requires additional components, system 500 first simplifies the net current vector by mathematically converting it to a two-axis framework 530 (see FIG. 8) (axes α and β) using the Clarke Transformation 540 (known in the art and also referred to as the Forward Clarke transformation). This transformation results in expression of the net current vector as its two components in the α, β reference frame: $i_\alpha$ and $i_\beta$ (see FIG. 9). These component vectors could theoretically be used to determine the desired $V_\alpha$ and $V_\beta$, which may be converted back to a three-axis system (e.g., three-axis system 550, depicted in FIG. 6) to drive the motor. However, further simplification is possible and desired, because the α and β axes form a stationary frame of reference while the net current vector is rotating through space. That means $i_\alpha$ and $i_\beta$ vary over time (e.g., sinusoidally), as shown in FIG. 9.

Accordingly, $i_\alpha$ and $i_\beta$ are transformed to a two-dimensional rotating frame of reference 560 (see FIG. 10) that is aligned and synchronized with the rotating rotor. In this reference frame, a first (direct) axis, d, is oriented along (i.e., directly aligned with) the rotor flux vector, and a second (quadrature) axis, q, is oriented at 90 degrees from the first axis. Note that the q axis is the direction in which the maximum torque is generated. A benefit of the rotating reference frame is that the axes are stationary relative to the rotor, and the component vectors will now be generally constant or slow-changing (i.e., DC currents), as shown in FIG. 11. To accomplish this simplification, $i_\alpha$ and $i_\beta$ are converted into $i_d$ and $i_q$, using the Park Transformation 570 (known in the art, and also referred to as the Forward Park Transformation).

At this point, $i_d$ and $i_q$ can be handled independently to manipulate the net current vector. It should be clear that any non-zero magnitude of $i_d$ will alter the net current vector from the quadrature (i.e., maximum-torque) direction. Accordingly, during normal operation, $i_d$ is usually commanded to be zero while $i_q$ is controlled in accordance with desired torque. With continuing reference to FIG. 5, the measured $i_d$ and $i_q$ are compared to the commanded $i_d$ and $i_q$, and respective proportional-integral (PI) controllers $PI_d$ and $PI_q$ are used to determine the corresponding $V_d$ and $V_q$. These voltage values are then passed through modules (labeled PARK$^{-1}$ and 2φ→3φ) that perform an Inverse Park Transformation and an Inverse Clarke Transformation to convert them back to the α, β stationary reference frame and finally to the three phase values needed for applying stator voltages Vu, Vv, and Vw.

The question remains what the commanded $i_d$ and $i_q$ should be. As depicted in FIG. 5, system 500 includes an intelligent regeneration controller module 510 that takes the commanded flux (direct) current $i_d$, the commanded torque (quadrature) current $i_q$, and the battery bus voltage, and determines the proper desired flux current to protect the battery from an over-voltage condition.

Commanded torque will depend on the desired speed and direction of the motor, as commanded by the user/rider. For example, in vehicles 10, 100, torque commands will be based on the tilt angle or orientation of the board, which is generally caused by user action. The flux command, on the other hand, depends on how much the system needs to weaken the overall flux, reduce the torque, and/or redirect excess current.

Turning now to FIGS. 12 and 13, methods are depicted suitable for execution by the motor controller. For example, intelligent regeneration controller 510 of system 500 may utilize one or both of these methods. Aspects of system 500 and/or vehicles 10, 100 may be utilized in the method steps described below. Where appropriate, reference may be made to components and systems that may be used in carrying out each step. These references are for illustration, and are not intended to limit the possible ways of carrying out any particular step of the method.

FIG. 12 is a flowchart illustrating steps performed in a method 700, and may not recite the complete process or all steps of the method. Although various steps of method 700 are described below and depicted in FIG. 12, the steps need not necessarily all be performed, and in some cases may be performed simultaneously or in a different order than the order shown.

In method 700, the system (e.g., system 500) monitors a battery bus voltage of the battery that is coupled to the motor in question (block 702). Although a single battery is referenced here, any number or combination of batteries or battery cells may be present. If battery voltage becomes greater than a selected overvoltage threshold (block 704), which may be a percentage of a fully-charged voltage rating (e.g., 100%, 110%), it may be assumed that power is being generated by the motor, e.g., in a regenerative braking or other situation where the CEMF is greater than the battery voltage. In response, the system may automatically increase the flux current (direct current $i_d$ described above). This increase in flux current acts both to divert excess current along a non-torque-inducing vector (i.e., "wasting" the excess current) and to weaken the motor flux. Weakening the motor flux results in lower CEMF and less excess current being generated in the first place. While the over-voltage condition is in effect, the flux current increase may be automatically continued until a selected maximum flux weakening value is reached (block 706).

Conversely, if battery bus voltage is determined to be less than the over-voltage limit (or threshold) (block 708), then the flux current is automatically decreased or reduced. This is done to prevent inefficient operation in normal operating conditions. In other words, in this situation reducing the direct current reduces inefficiency of the motor. As long as the over-voltage condition is absent, the flux current reduction may be automatically continued until a selected minimum flux weakening value (e.g., zero amps) is reached (block 710).

FIG. 13 is a flowchart illustrating steps performed in a method 800, and may not recite the complete process or all steps of the method. Although various steps of method 800 are described below and depicted in FIG. 13, the steps need not necessarily all be performed, and in some cases may be performed simultaneously or in a different order than the order shown.

Step 802 of algorithm 800 includes comparing the bus voltage of the power supply (e.g., the battery) to an over-voltage limit or threshold. If the bus voltage is below the limit, step 804 includes reducing a flux current setpoint, unless the setpoint is already at zero. If the bus voltage is at or above the limit, step 806 includes increasing the flux current setpoint, unless the setpoint is already at a selected maximum allowable value.

Step 808 includes comparing the flux current setpoint to the commanded flux current. Whichever value is higher is then passed on to the controller as the desired flux current. In other words, if commanded flux exceeds the flux setpoint, desired flux will be set to the commanded flux. If commanded flux is less than the flux setpoint, desired flux will be set to the higher setpoint. This results in a raising of the commanded flux in situations where an overvoltage situation is in progress. Increases and decreases of the flux setpoint may be iterative in nature. In some examples, the increases and decreases happen in substantially equal jumps. In some examples, quantum increases are larger than quantum decreases, such that the redirection of current to the flux weakening vector will respond faster than the reverse operation.

After completing step 808, the algorithm loops back to step 802 to continue the control method. In some examples, this looping is substantially continuous. In some examples, each iteration of the loop is triggered by an event, e.g., in the case of an interrupt handler kicked off by an interrupt request (IRQ).

D. Illustrative Combinations and Additional Examples

This section describes additional aspects and features of control systems having over-voltage prevention features in regenerative energy situations, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

C0. An electric vehicle with one or more wheels driven by a permanent magnet motor, wherein the vehicle uses said motor for braking, comprising a control system in which a novel technique is implemented to dispose of the excess power when the vehicle is regenerating power to prevent over-voltage damage to the system. The novel technique disposes of energy by intentionally inefficiently operating the motor when the batteries are fully charged and cannot safely absorb more regenerated power.

C1. The technique of C0 may be used to prevent exceeding the battery cells' maximum charge rate in hard braking/downhill scenarios.

D0. A self-balancing vehicle having a motor that provides braking torque while descending downhill or stopping, having a control system that results in reduced risk of damaging the system or suddenly shutting down when the battery is near full charge. This allows the self-balancing vehicle to drive downhill at a faster speed and stop quickly with less risk of system damage and less risk of rider injury.

E0. In some embodiments, a permanent magnet motor (BLDC) control technique is provided that drives the motor in field-oriented control (FOC) allowing the flux and torque currents to be manipulated independently. The motor flux can be controlled in such a way as to reduce the back-EMF voltage, which reduces regenerated current. In addition to reducing the back-EMF, this process also wastes excess energy in the process by flowing current in the flux region of the motor, further disposing of the regenerated power.

F0. Control techniques described herein may drive the permanent magnet motor in such a way as to continue to have braking torque while reducing or eliminating the regenerated power, allowing the rider to continue downhill at a faster speed and/or stop quickly without raising the system voltage and damaging the control system and battery pack.

G0. Aspects of the present disclosure may also be relevant to systems with mechanical brakes (electric bicycles, motorcycles, cars, etc.) but which seek to use regenerative braking even when at a high state of charge.

H0. A control system for an electric vehicle, the control system comprising:
a power supply;
an electric motor coupled to the power supply; and
a motor controller having a field-oriented control (FOC) scheme configured to control the electric motor by manipulating a direct current aligned with a rotating rotor flux angle and a quadrature current defined at ninety degrees from the rotating rotor flux angle, wherein manipulation of the direct current is independent of manipulation of the quadrature current, and the motor controller includes processing logic configured to:
determine whether a counter electromotive force (CEMF) of the electric motor exceeds a voltage of the power supply by comparing a bus voltage of the power supply to a voltage threshold; and
in response to the bus voltage being greater than the voltage threshold, weakening a motor flux of the electric motor and reducing the CEMF by automatically increasing the direct current.

H1. The control system of H0, wherein the processing logic of the motor controller is further configured to:
while the bus voltage is greater than the voltage threshold, automatically continue to increase the direct current of the motor; and
in response to the direct current reaching a direct current threshold, automatically stop increasing the direct current.

H2. The control system of any one of paragraphs H0 through H1, wherein automatically increasing the direct current comprises:
increasing a flux setpoint of the motor controller by a selected amount;
comparing an existing flux command to the flux setpoint; and
adjusting direct current to a higher of the existing flux command and the flux setpoint.

H3. The control system of any one of paragraphs H0 through H2, wherein the processing logic of the motor controller is further configured to: in response to the bus voltage being less than the voltage threshold and the direct current being greater than zero, reducing inefficiency of the motor by automatically reducing the direct current.

H4. The control system of H3, wherein automatically reducing the direct current comprises:
decreasing a flux setpoint of the motor controller by a selected amount;
comparing an existing flux command to the flux setpoint; and
adjusting direct current to a higher of the existing flux command and the flux setpoint.

H5. The control system of any one of paragraphs H0 through H4, wherein the power supply comprises a lithium ion battery.

H6. The control system of claim 1, wherein the electric motor comprises a hub motor configured to rotate a wheel of a vehicle.

Note: Paragraph labels beginning with the letter "I" are intentionally skipped, to avoid confusion with the number "1".

J0. An electric vehicle comprising:
one or more wheels;
an electric hub motor coupled to a power supply and configured to drive the one or more wheels;
a motor controller having a field-oriented control (FOC) scheme configured to control the electric hub motor by manipulating a direct current aligned with a rotating rotor flux angle and a quadrature current defined at ninety degrees from the rotating rotor flux angle, wherein manipulation of the direct current is independent of manipulation of the quadrature current, and the motor controller includes processing logic configured to:
determine whether a counter electromotive force (CEMF) of the electric motor exceeds a voltage of the power supply by comparing a bus voltage of the power supply to a voltage threshold; and
in response to the bus voltage being greater than the voltage threshold, weakening a motor flux of the electric motor and reducing the CEMF by automatically increasing the direct current.

J1. The vehicle of J0, wherein the vehicle has exactly one wheel.

J2. The vehicle of J1, wherein the vehicle comprises a self-balancing electric skateboard, the skateboard comprising:
a board including first and second deck portions each configured to receive a left or right foot of a rider oriented generally perpendicular to a direction of travel of the board;
a wheel assembly including the exactly one wheel disposed between and extending above the first and second deck portions, wherein the electric hub motor is configured to rotate the wheel around an axle to propel the skateboard; and
at least one sensor configured to measure orientation information of the board;
wherein the motor controller is further configured to receive orientation information measured by the sensor and to cause the hub motor to propel the skateboard based on the orientation information.

J3. The vehicle of any one of paragraphs J0 through J2, wherein the processing logic of the motor controller is further configured to:
while the bus voltage is greater than the voltage threshold, automatically continue to increase the direct current of the motor; and
in response to the direct current reaching a direct current threshold, automatically stop increasing the direct current.

J4. The vehicle of any one of paragraphs J0 through J3, wherein automatically increasing the direct current comprises:
increasing a flux setpoint of the motor controller by a selected amount;
comparing an existing flux command to the flux setpoint; and
adjusting direct current to the higher of the existing flux command and the flux setpoint.

J5. The vehicle of any one of paragraphs J0 through J4, wherein the processing logic of the motor controller is further configured to: in response to the bus voltage being less than the voltage threshold and the direct current being greater than zero, reducing inefficiency of the motor by automatically reducing the direct current.

J6. The vehicle of J5, wherein automatically reducing the direct current comprises:
decreasing a flux setpoint of the motor controller by a selected amount;
comparing an existing flux command to the flux setpoint; and
adjusting direct current to a higher of the existing flux command and the flux setpoint.

K0. A method for preventing damage to a power supply of an electric vehicle during regenerative braking, the method comprising:
controlling an electric motor using a motor controller having a field-oriented control (FOC) scheme configured to control the electric motor by manipulating a direct current aligned with a rotating rotor flux angle and a quadrature current defined at ninety degrees from the rotating rotor flux angle, wherein manipulation of the direct current is independent of manipulation of the quadrature current;
using processing logic of the motor controller to determine whether a counter electromotive force (CEMF) of the electric motor exceeds a voltage of the power supply; and
in response to the CEMF of the electric motor exceeding the voltage of the power supply, weakening a motor flux of the electric motor and reducing the CEMF by automatically increasing the direct current.

K1. The method of K0, wherein determining whether the CEMF of the electric motor exceeds the voltage of the power supply comprises comparing a bus voltage of the power supply to a voltage threshold.

K2. The method of K0 or K1, further comprising: while the CEMF of the electric motor exceeds the voltage of the power supply, automatically continuing to increase the direct current of the motor until the direct current reaches a direct current threshold.

K3. The method of any one of paragraphs K0 through K2, wherein automatically increasing the direct current comprises:
increasing a flux setpoint of the motor controller by a selected amount;
comparing an existing flux command to the flux setpoint; and
adjusting direct current to a higher of the existing flux command and the flux setpoint.

K4. The method of any one of paragraphs K0 through K3, further comprising: in response to the CEMF of the electric motor being below the voltage of the power supply and the direct current being greater than zero, reducing inefficiency of the motor by automatically reducing the direct current.

K5. The method K4, wherein automatically reducing the direct current comprises:
decreasing a flux setpoint of the motor controller by a selected amount;
comparing an existing flux command to the flux setpoint; and
adjusting direct current to a higher of the existing flux command and the flux setpoint.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A control system for an electric vehicle, the control system comprising:
a power supply;
an electric motor coupled to the power supply; and
a motor controller having a field-oriented control (FOC) scheme configured to control the electric motor by manipulating a direct current aligned with a rotating rotor flux angle and a quadrature current defined at ninety degrees from the rotating rotor flux angle, wherein manipulation of the direct current is independent of manipulation of the quadrature current, and the motor controller includes processing logic configured to:
determine whether a counter electromotive force (CEMF) of the electric motor exceeds a voltage of the power supply by comparing a bus voltage of the power supply to a voltage threshold; and
in response to the bus voltage being greater than the voltage threshold, weakening a motor flux of the electric motor and reducing the CEMF by automatically increasing the direct current.

2. The control system of claim 1, wherein the processing logic of the motor controller is further configured to:
while the bus voltage is greater than the voltage threshold, automatically continue to increase the direct current of the motor; and
in response to the direct current reaching a direct current threshold, automatically stop increasing the direct current.

3. The control system of claim 1, wherein automatically increasing the direct current comprises:
increasing a flux setpoint of the motor controller by a selected amount;
comparing an existing flux command to the flux setpoint; and
adjusting direct current to a higher of the existing flux command and the flux setpoint.

4. The control system of claim 1, wherein the processing logic of the motor controller is further configured to:

in response to the bus voltage being less than the voltage threshold and the direct current being greater than zero, reducing inefficiency of the motor by automatically reducing the direct current.

5. The control system of claim 4, wherein automatically reducing the direct current comprises:
   decreasing a flux setpoint of the motor controller by a selected amount;
   comparing an existing flux command to the flux setpoint; and
   adjusting direct current to a higher of the existing flux command and the flux setpoint.

6. The control system of claim 1, wherein the power supply comprises a lithium ion battery.

7. The control system of claim 1, wherein the electric motor comprises a hub motor configured to rotate a wheel of a vehicle.

8. An electric vehicle comprising:
   one or more wheels;
   an electric hub motor coupled to a power supply and configured to drive the one or more wheels;
   a motor controller having a field-oriented control (FOC) scheme configured to control the electric hub motor by manipulating a direct current aligned with a rotating rotor flux angle and a quadrature current defined at ninety degrees from the rotating rotor flux angle, wherein manipulation of the direct current is independent of manipulation of the quadrature current, and the motor controller includes processing logic configured to:
      determine whether a counter electromotive force (CEMF) of the electric motor exceeds a voltage of the power supply by comparing a bus voltage of the power supply to a voltage threshold; and
      in response to the bus voltage being greater than the voltage threshold, weakening a motor flux of the electric motor and reducing the CEMF by automatically increasing the direct current.

9. The vehicle of claim 8, wherein the vehicle has exactly one wheel.

10. The vehicle of claim 9, wherein the vehicle comprises a self-balancing electric skateboard, the skateboard comprising:
   a board including first and second deck portions each configured to receive a left or right foot of a rider oriented generally perpendicular to a direction of travel of the board;
   a wheel assembly including the exactly one wheel disposed between and extending above the first and second deck portions, wherein the electric hub motor is configured to rotate the wheel around an axle to propel the skateboard; and
   at least one sensor configured to measure orientation information of the board;
   wherein the motor controller is further configured to receive orientation information measured by the sensor and to cause the hub motor to propel the skateboard based on the orientation information.

11. The vehicle of claim 8, wherein the processing logic of the motor controller is further configured to:
   while the bus voltage is greater than the voltage threshold, automatically continue to increase the direct current of the motor; and
   in response to the direct current reaching a direct current threshold, automatically stop increasing the direct current.

12. The vehicle of claim 8, wherein automatically increasing the direct current comprises:
   increasing a flux setpoint of the motor controller by a selected amount;
   comparing an existing flux command to the flux setpoint; and
   adjusting direct current to the higher of the existing flux command and the flux setpoint.

13. The vehicle of claim 8, wherein the processing logic of the motor controller is further configured to:
   in response to the bus voltage being less than the voltage threshold and the direct current being greater than zero, reducing inefficiency of the motor by automatically reducing the direct current.

14. The vehicle of claim 13, wherein automatically reducing the direct current comprises:
   decreasing a flux setpoint of the motor controller by a selected amount;
   comparing an existing flux command to the flux setpoint; and
   adjusting direct current to a higher of the existing flux command and the flux setpoint.

15. A method for preventing damage to a power supply of an electric vehicle during regenerative braking, the method comprising:
   controlling an electric motor using a motor controller having a field-oriented control (FOC) scheme configured to control the electric motor by manipulating a direct current aligned with a rotating rotor flux angle and a quadrature current defined at ninety degrees from the rotating rotor flux angle, wherein manipulation of the direct current is independent of manipulation of the quadrature current;
   using processing logic of the motor controller to determine whether a counter electromotive force (CEMF) of the electric motor exceeds a voltage of the power supply; and
   in response to the CEMF of the electric motor exceeding the voltage of the power supply, weakening a motor flux of the electric motor and reducing the CEMF by automatically increasing the direct current.

16. The method of claim 15, wherein determining whether the CEMF of the electric motor exceeds the voltage of the power supply comprises comparing a bus voltage of the power supply to a voltage threshold.

17. The method of claim 15, further comprising:
   while the CEMF of the electric motor exceeds the voltage of the power supply, automatically continuing to increase the direct current of the motor until the direct current reaches a direct current threshold.

18. The method of claim 15, wherein automatically increasing the direct current comprises:
   increasing a flux setpoint of the motor controller by a selected amount;
   comparing an existing flux command to the flux setpoint; and
   adjusting direct current to a higher of the existing flux command and the flux setpoint.

19. The method of claim 15, further comprising:
   in response to the CEMF of the electric motor being below the voltage of the power supply and the direct current being greater than zero, reducing inefficiency of the motor by automatically reducing the direct current.

20. The method of claim 19, wherein automatically reducing the direct current comprises:
   decreasing a flux setpoint of the motor controller by a selected amount;

comparing an existing flux command to the flux setpoint; and adjusting direct current to a higher of the existing flux command and the flux setpoint.

* * * * *